United States Patent [19]

Takahashi

[11] Patent Number: 4,697,851
[45] Date of Patent: Oct. 6, 1987

[54] METHOD OF MANUFACTURING FIBER BUNDLES FOR USE IN BRUSHES

[75] Inventor: Yasuo Takahashi, Yokohama, Japan

[73] Assignee: Shinwa Seisakusho Co., Ltd., Yokohama, Japan

[21] Appl. No.: 927,540

[22] Filed: Nov. 5, 1986

[30] Foreign Application Priority Data

Nov. 19, 1985 [JP] Japan .................................. 60-257661

[51] Int. Cl.$^4$ ............................ A46D 1/00; A46B 9/04
[52] U.S. Cl. ............................................ 300/1; 300/8; 300/21
[58] Field of Search .......... 15/159 R, 159 A, 190–193; 300/1, 8, 9, 21

[56] References Cited

U.S. PATENT DOCUMENTS 3,926,475 12/1975 McCaffray, Jr. ..................... 300/21
4,441,227 4/1984 d'Argembeau ............... 15/191 R X
4,592,594 6/1986 d'Argembeau ....................... 300/21

Primary Examiner—Timothy V. Eley
Attorney, Agent, or Firm—Bucknam and Archer

[57] ABSTRACT

A method for manufacturing a final fiber bundle for use in brushes is highly efficiently applicable to synthetic fibers having poor thermal stability. The method comprises the steps of: (a) arranging a number of synthetic thermoplastic fibers so that at least one end of each fiber is positioned in the same plane, to obtain a fiber bundle, (b) compressing the thus obtained fiber bundle to the extent that the compressed fiber bundle takes a desired cross-sectional shape and has a desired bulk density, (c) irradiating the fiber ends in the same plane with energy beams to fusion bond them together, and (d) releasing the compression to obtain a final bundle having a fusion bonded fiber ends. In a case where the synthetic fibers are not thermoplastic, a thermoplastic adhesive is additionally used in the step of irradiation.

16 Claims, 4 Drawing Figures

METHOD OF MANUFACTURING FIBER BUNDLES FOR USE IN BRUSHES

BACKGROUND OF THE INVENTION

1. Field of the Invention

The present invention relates to a method of manufacturing a synthetic fiber bundle for use in cosmetic brushes, paint brushes, and writing brushes.

2. Prior Art

Conventionally, the head of brushes of this type was manufactured by manually tying up animal hair such as horse hair, wool and pig hair, at its end with a wire or a thread, etc., to obtain a bundle and, if necessary, cutting and shaping the thus obtained bundle so that its cross section takes a prescribed shape or shaping the bundle with a highly viscous paste. This conventional method is extremely labor-saving and low in production efficiency. In addition, it is inconvenient because in pasting it up as described above, the method requires great skill to provide a proper degree of penetration of the paste solution.

On the other hand, to solve recent problems with respect to not only a limit in resources of animal hair but also sanitation and environments in an animal hair treatment, substitution of an animal hair-made head by a synthetic resin-made head has been used. Moreover, methods for more effectively manufacturing such heads profitably employing the properties of synthetic fibers have also been investigated.

For example, the present inventor used thermoplastic synthetic fibers such as nylon fibers made by a melt spinning method to obtain a fiber bundle for use as material for one such head, after which the thus obtained bundle was heated at one end surface to fuse the fibers of the bundle together at that end instead of tying up or pasting up the fibers at that end. It was proposed to use the bundle so heat treated as a head of a brush.

Since, however, this conventional method comprises heating one end surface of the fiber bundle by contacting a heater such as an electrical heater plate with the bundle end surface or allowing the former to approach the latter, the thickness of the fused layer of the bundle is non-uniform due to slight unevenness of the original bundle end, whereby the thus fusion treated fiber bundle or head longitudinally cracks in the thinner part of the fusion bonded layer. To obtain a fusion bonded layer having a proper thickness of the fusion bonded layer, great skill is undesirably required for setting the temperature of the electrical heater plate, its contact pressure against the bundle end surface, the distance between the heater plate and the bundle end surface, the heating time, etc. With an apparatus for implementing such a conventional method it takes about 90 seconds to complete the fusion bonding and about 100 seconds to manufacture one head. Accordingly, there can be obtained only thirty six heads per hour, or only two hundred and eighty-eight bundles per day asuming the working time to be eight hours per day. This low fusion bonding rate will result in a decrease in productivity since one worker is required to operate one device for carrying out the fusion bonding and hence such a method is not deemed to be a satisfactory.

Hereupon, the present inventor intended to improve the method described above; he devised and implemented a method of forming a fiber bundle for use as a brush head which comprises (1) providing a fiber bundle, called "hank", having a diameter of about 50 mm and a length of about 1.5 m formed by tying up, for example, fibers for wigs or the like and then winding the thus provided fiber bundle with paper in the same manner as a bandage is wound so as not to permit the bundle to have tendency to bend, (2) cutting the bundle to obtain a plurality, for example several tens, of bundle pieces of suitable length, (3) contacting the surface of one end of the pieces with a heat source such as a heated metal plate or allowing it to approach the heated plate to fuse the surface, (4) cooling the fused surface for solidification and (5) then separating the bundle pieces or heads in each of which the tips of the fibers have been fusion bonded together, from each other. According to this method, the fusion bonding time for each fiber bundle is merely about 3 seconds, assuming that the number of fiber bundles to be fusion bonded simultaneously is 30.

However, the above method took much time to separate the resulting heads from each other. Moreover, this method is not too satisfactory one since its production rate is low as in the case of the previously mentioned method by which brush heads are produced one by one. Furthermore, when the method is applied to synthetic fibers not having sufficient thermal stability, fusion and thermal decomposition of the fibers, though depending on the rate of raising the temperature, will simultaneously take place whereby a strong fusion bonded surface cannot be formed.

Synthetic fibers, such as modacrylic fibers which are obtained from a copolymer of vinyl chloride and acrylonitrile, obtained by means of a solution spinning method are excellent in surface condition and touch as compared with nylon fibers, etc., and in particular the modacrylic fibers, etc., resemble wool in touch and are suitable as a substitute for animal hair. Therefore, it is earnestly desired in this field to develop a method of manufacturing fiber bundles which is applicable to synthetic fibes having poor thermal stability obtained by means of such a solution spinning method.

SUMMARY OF THE INVENTION

In view of the drawbacks of the prior methods, it is an object of the present invention to provide a method of manufacturing a fiber bundle for use in a brush with industrially higher efficiency, the method being also applicable to the case where synthetic fibers of poor thermal stability are employed as a starting fibrous material.

The above object may be achieved by the use of a method of manufacturing a fiber bundle for use in brushes which comprises the steps of: orienting a number of synthetic thermoplastic fibers, while arranging the fibers so that at least one end of each fiber is positioned in the same plane, compressing the fibers laterally to the extent that a predetermined bulk density of the fibers is reached, irradiating energy beams to the fiber ends positioned in a predetermined area of said plane to fusion bond the fiber ends together in said area, releasing the compression and, if necessary, removing the non-bonded fibers to obtain the desired fiber bundle. The fiber ends in the same plane seem to constitute an end surface of the fiber. Thus, such ends are sometimes called the "end surface" of the fibers throughout the specification and claims. In a case where non-thermoplastic fibers are arranged and compressed as previously mentioned to form a compressed fiber bundle, it is necessary to apply a powdered thermoplastic adhesive to the end surface of the compressed fiber bundle.

The fiber bundles obtained as the end products according to the present invention may be used as a brush head for cosmetic brushes such as face powder, eye liner, eye shadow, mascara, manicure and lipstick brushes, for paint brushes of any type and for writing brushes.

More specifically, the crux of the present invention resides in the use of energy beams such as laser beams as a heat source for the thermal bonding.

The present invention will be better understood with reference to the accompanying drawing in which FIGS. 1 to 4 are indicated, FIG. 1 illustrates the step of arranging a number of synthetic fibers in such a manner that one end of each of the fibers is positioned in the same plane to obtain a fiber bundle, according to this invention;

FIG. 2 illustrates the step of compressing the arranged synthetic fibers and then irradiating the end surface with energy beams through a mask provided with openings having a predetermined shape;

FIG. 3 illustrates the step of releasing the compression to obtain a fiber bundle having a fusion bonded layer;

FIG. 4 illustrates the final fiber bundle for use in brushes obtained according to this invention.

Referring to FIG. 1, a fiber bundle obtained by typing up many synthetic fibers of, e.g., 1.5 m in length is wound with a removal material (for example, paper) like a bandage, which bundle is called a hank and serves as a starting fibrous material for manufacturing fiber bundles for use in various kinds of brushes. A hank 1 is cut into hank pieces 1' which are slightly longer in size than brush heads to be obtained. A Cellotape (which is not shown here and is a cellophane tape supplied under the tradename of Cellotape) is longitudinally applied to the paper wound around the hank 1 to prevent the wound paper from unwinding even when the hank pieces 1' are obtained by cutting the hank 1.

Referring to FIG. 2 in which the hank piece 1' is indicated in a somewhat magnified form as compared with that in FIG. 1, the hank piece 1' is centripetally compressed and the peripheral portions of the compressed fiber bundle may be cut off (although they may not be cut off) to obtain a compressed fiber bundle 2 having a square cross section. A mask 3 is placed on one end surface 1'a of the compressed fiber bundle 2 and the end surface is irradiated with energy beams 4. The energy beams include laser beams radiated from a laser oscillator such as a $CO_2$ laser, visible lights and heat rays emanating from an incandescent lamp, a high brightness lamp or the like, and infrared rays radiated from an infrared lamp or the like; they further include electron beams, radiation from plasma, and ion beams, but the use thereof requires that the compressed fiber bundle 2 be set in vacuum. It is required that the material of the mask 3 be sparingly permeable or impermeable to energy beams.

As shown in FIG. 3, a fusion bonded layer 5a is formed on the end surface 1'a of the compressed fiber bundle 2 owing to the irradiation of the energy beams. Hereupon, portions of compressed fibers whose ends form a fusion bonded layer 5a are withdrawn from the compressed fiber bundle 2, after which the non-bonded fibers 1'b attached to the thus withdrawn portions are removed therefrom if necessary, thereby to obtain desired fiber bundles 5 (FIG. 4) for use in brushes.

The desired fiber bundle so obtained is so treated that the free ends of the fibers of the bundle are sharpened like the tip of animal hair by making use of for example "a method of sharpening the tip of synthetic fibers" disclosed in Japanese Patent Gazette No. 58-4113.

Moreover, various modifications of the present invention may be made therein without departing from the scope of the present invention. For example, it is also possible that synthetic resin fibers are tied up and compression molded into a fiber bundle having a predetermined shape and the same cross section as a brush head to be obtained, after which one or more of the resulting fiber bundles arranged side by side are irradiated with energy beams. In addition, energy beams may be adjusted to impinge upon the predetermined portion of the end surface of the compressed fiber bundle, the predetermined surface portion being equal in dimension to and the same in shape as the cross section of a brush head to be produced, thereby to form a fusion bonded layer 5a on the bundle. The mask 3 is not required in these cases.

The fibers which may be employed in the present invention, are not specifically limited. Those which are a substitute for animal hair, are preferably acrylic fibers and modacrylic fibers in view of their desirable surface conditions and touch. These fibers are known as being similar in properties to wool.

In order to properly arrange synthetic fibers so that at least one end of the fibers is positioned in the same plane according to the present invention, a staple shaped bundle composed of many fibers tied up may be cut as it is, or the ends of fibers of a predetermined length may be made to be positioned in the same plane to form the end surface of the fibers by applying vibration or the like thereto.

A cut hank according to the present invention is compressed to obtain a prescribed bulk density, whereby the bulk density of the fibers at the end surface thereof is made uniform, and hence the amount of fibers (the number of fibers) shared as a fiber bundle for a brush and included in a predetermined end surface area can be easily made constant and the ends of the constant amount of fibers may be fusion bonded by the subsequent irradiation of energy beams. The degree of fiber compression may properly be determined depending on the use of brushes, and the kinds and sizes of fibers used. For example, for a cosmetic brush, a space ratio of from 20 to 50% is preferable and that from 20 to 40% is more preferable. It is difficult to produce a highly compressed fiber bundle having a space ratio of as low as less than 20%, and such a fiber bundle is unsuitable for a cosmetic brush head because the free ends thereof after fusion bonded will spread like an earpick. On the other hand, a low compressed fiber bundle having a space ratio of more than 50% is difficult to fuse bond the end of the bundle. Even if it can be fusion bonded, the strength of the fusion bond is insufficient and this will cause the fibers of the bundle to be separated from one another even when a slight push is applied to the bundle by a finger. The pressure needed to obtain a predetermined bulk density is not specifically limited but it is preferably in the range of from 200 $g/cm^2$ to 200 $kg/cm^2$, nor preferably from 500 $g/cm^2$ to 100 $kg/cm^2$ and most preferably from 1 to 50 $kg/cm^2$.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS

Example 1

Figure 1:
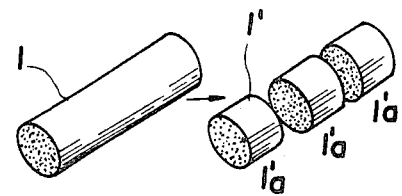
FIGS. 1 through 4 are views each illustrating a processing state of a synthetic fiber bundle in each step of methods of manufacturing fiber bundles for brushes according to the present invention.
Figure 2:
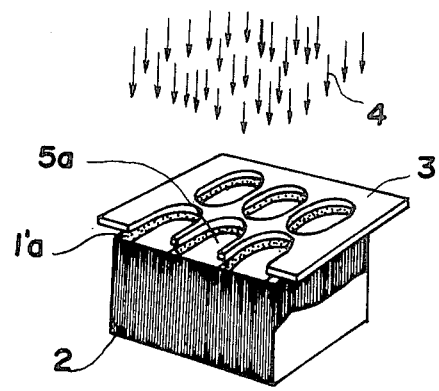
Figures 3, 4:
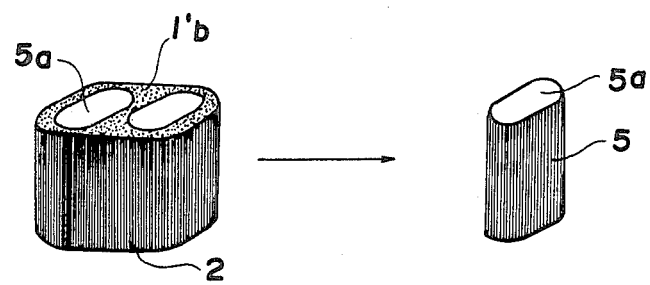

A hank 1 having a diameter of about 50 mm composed of Kanegafuchi Kagaku Inc. made Kanegote fibers each having a diameter of 0.03 mm was cut to obtain cut hanks 1' having a length of about 33 mm. A stamped-out iron plate mask having a frame of 2 mm in thickness, and an elliptic opening having an oblong shape, a width of about 5 mm and a length of 12 mm, the frame of the mask being rounded at the lengthwise ends to have a radius of 2.5 mm, is placed about 3 mm away from and just above the end surface of the cut hank. The cut hank was irradiated through said opening with 100 W single mode $CO_2$ gas laser beams having a diameter of 13 mm for 0.53 sec. The cut hank portion the end of which has been fusion bonded was withdrawn from the cut hank after removal of the mask and freed from the fibers attached to the cut hank portion so withdrawn, thus obtaining an end surface-fusion bonded fiber bundle (final fiber bundle or brush head) having a cross section in conformity with the shape of said opening. The thickness of the fusion bonded layer of the fiber bundle so obtained was substantially fixedly 0.3 mm. The fusion bonded end surface retained a pattern which has been formed due to slight friction before the fusion bonding. Moreover, the strength of the fusion bonded portion was also sufficient to employ as a fiber bundle for brushes without being broken even if it is folded to some extent with a hand and without causing any fibers to fall off. The thickness of the fusion bonded layer is preferably in the range of from 0.05 to 0.5 mm and more preferably 0.1 to 0.3 mm.

The fiber bundle so obtained was inserted into the recess of a mating handgrip and the fusion bonded portion of the bundle was fixed with a binder in the recess, after which the free end of the bundle was cut to obtain a desired shape of the bundle as a brush head and the free ends of fibers of the bundle were sharpened as animal hair in accordance with a method disclosed in for example Japanese Patent Gazette No. 58-4113, thus obtaining a cosmetic cheek brush in which the final fiber bundle or brush head was securely fixed at its fusion bonded portion to the handgrip.

According to the present embodiment, the time of irradiation towards the cut hank end surface with laser beams was 0.52 sec. as described above. This means that the irradiation time is shortened to about 1/200 as compared with that of about 100 sec. per fiber bundle in the case of a conventional heating and fusion bonding method.

Laser beams have in general a conspicuous heating effect produced by coherent electromagnetic waves sharply increased in their energy density owing to their wavelengths put in order; only the surface irradiated with the laser beams is heated and increased in temperature substantially instantaneously and the heated portion is quickly cooled just after the cut of the laser beams because of slight heat conduction to the other portions of the surface to which no heat produced with laser irradiation is transmitted. Hereby, selective fusion bonding of only portions of the fibers irradiated with the laser beams can be achieved substantially without causing thermal decomposition thereof.

As described previously, the prior method takes heating time of about 90 sec. for sufficient fusion bonding because when heating the portions to be fusion bonded, a part of the heat is lost by heat conduction to the air. For this reason, any fibers having poor thermal stability will be fused and thermally decomposed simultaneously when heated for as long as 90 sec. with the result that the fusion bonded surface is made fragile. In contrast, laser beams substantially instantaneously raise the temperature of the ends of fibers to fuse them, and the ends quickly cool prior to the thermal decomposition thereof.

Moreover, the laser beams heat only a surface directly irradiated therewith while they do not heat a shaded portion not irradiated therewith, whereby the surface to be fusion bonded, though it is slightly uneven, is uniformly heated irrespective of the slight unevenness.

According to the present embodiment employing such essential properties of laser beams, the end surface of a fiber bundle composed of many staple fibers put in order can be so treated that only a specified portion of the end surface is fusion bonded as in lithography for example. Namely, only the portions needed to be fusion bonded are fused without fusion bonding other portions not to be done so.

Example 2

A second embodiment of the present invention will likewise be described with reference to the accompanying drawing.

Fifty-one (51) g of a fiber bundle of modacrylic fibers having a fineness of 24$d$, specific gravity of 1.25, and length of 35 mm were so arranged that the ends of the fibers are positioned in the same plane and laterally compressed to produce a compressed fiber bundle having a volume of 62.16 cm$^3$. The space rate of the compressed fiber bundle so prepared was 0.36 and the bulk density thereof 0.820 g/cm$^3$. A metal plate from which twenty-eight metal portions having a length of 12 mm and width of 4.6 mm had been stamped out was placed on the end surface of the compressed fiber bundle, and a 100 W single mode $CO_2$ gas laser having a beams diameter of 13 mm was focused through a focusing lens having a focal length of 127 mm onto the end surface of the compressed fiber bundle 250 mm spaced away from the laser source so as to provide a spot diameter of about 6.0 mm at the end surface of the compressed bundle, which end surface was then scanned with the laser beams at a speed of 2.4 m/min. The fusion bonded surface of the compressed fiber bundle was uniform, and twenty eight cosmetic brush fiber bundles each having a fusion bonded layer of 0.3 mm were produced at a time by disjointing the compressed fiber bundle. The dimensional accuracy of the fusion bonded surface of the brush fiber bundle was ±0.15 mm or less with respect to the set size, and the time needed to prepare the brush fiber bundle from the compressed fiber bundle was 0.52 sec. per brush fiber bundle.

Example 3

A third embodiment of the present invention will further be described with reference to the accompanying drawing.

57 g of fibers of nylon 6.10 having a fineness of 3 mil and specific gravity of 1.09 were tied up and arranged so that the ends of the fibers were positioned in the same plane as in Example 1 to provide a fiber bundle, which was compressed to obtain a compressed fiber bundle having a volume of 65.85 cm$^3$. The compressed fiber bundle had a space rate of 0.21 and a bulk density of 0.866 g/cm$^3$. The nylon compressed fiber bundle was scanned with $CO_2$ gas laser beams under the same conditions as those in Example 1 for yielding twenty eight final fiber bundles (for cosmetic brushes) each fusion bonded at its end surface. The dimensional accuracy of the fusion bonded surface ranged within ±0.15 mm with respect to the set size, and the time needed to prepare the end surface fusion bonded brush fiber bundle from the compressed fiber bundle was 0.52 sec.

Effect of the Invention

The effects of the present invention are as follows:

(1) The fibers having poor thermal stability such as modacrylic fibers, are impossible to substantially fusion bond by the use of said prior methods. If possible, the resulting fusion bonded surface will exhibit a dark color which clearly means that decomposition of the surface (the ends of fibers) has proceeded, and it will be comparatively fragile. While, according to the present invention, the fibers can be fusion bonded at their ends to obtain a fiber bundle for brushes which is sufficiently usable as such.

(2) The time needed to fusion bond one fiber bundle can greatly be shortened.

Energy beams have a higher energy density to speed up a rise in temperature of the irradiated surface, thus substantially instantaneously raising in temperature the end surface to the fusion bonding temperature. Accordingly, the time required for the irradiation is reduced for completing the fusion bonding, and fusion and cooling for solidification of the end surface will be completed before thermal decomposition thereof otherwise starts. Thus, even fibers having poor thermal stability such as modacrylic fibers can be fusion bonded. In addition, the time required for fusion bonding can also be shortened because of the irradiation time being short.

(3) With the prior method, brush fiber bundles were obtained by fusion bonding all the end surface of the fibers and then cutting the fusion bonded end surface in a desired pattern and separating the resulting cut fusion bonded end portions each having the fibers extending therefrom thereby to obtain fiber bundles for brushes. According to the present invention, on the other hand, only fusion bonded surface portions having a desired pattern are formed like islands on the end surface; thus, the cutting of the fusion bonded end surface needed in the prior methods is dispensed with, this eliminating one of the steps.

(4) A uniform thickness of the fusion bonded layer can be assured irrespective of the presence of some unevenness of the surface to be irradiated.

Energy beams slightly vary in irradiation heat amount with a change in distance between the source of energy beams and the surface to be irradiated. Accordingly, the amounts of heat received at any parts of the end surface irradiated will vary little differ from one another depending on the unevenness of said surface. Thus, some unevenness of the end surface to be irradiated will hardly influence the thickness of a fusion bonded layer to be formed in said surface. Even if the end surface is formed into a completely flat one by cutting the fibers the ends of which form said original end surface, slight unevenness will usually be formed as a pattern on the thus formed completely flat end surface due to friction caused thereon in the subsequent operations.

(5) The fusion bonded portion of fibers is superior in accuracy of shape to that manually made with a binder in the prior methods. Thus, this renders it possible to automatize of components such as a fiber bundle having a fusion bonded portion at the end and a handgrip for the fiber bundle when final products such as cosmetic brushes are desired to be made.

(6) Since the shape of a fusion bondes surface may optionally be selected, it is possible to manufacture a final fiber bundle having any desired cross section for use in cosmetic brushes.

What is claimed is:

1. A method for manufacturing a final fiber bundle for use in brushes which comprises the steps of:
   (a) arranging a number of synthetic thermoplastic fibers in such a manner that at least one end of each of the fibers is positioned in the same plane, to obtain a fiber bundle,
   (b) compressing the thus arranged thermoplastic fibers to the extent that the resulting compressed fiber bundle takes a predetermined cross-sectional shape and the bulk density thereof reaches a predetermined one, whereupon the fiber ends in the same plane seem to constitute an end surface of the fiber bundle,
   (c) irradiating said end surface of the bundle with energy beams to fusion bond the compressed fiber ends together in the end surface, and
   (d) releasing said compression to obtain a final fiber bundle having a fusion bonded layer.

2. A method for manufacturing a final fiber bundle according to claim 1, wherein said energy beams are $CO_2$ gas laser beams.

3. A method for manufacturing a final fiber bundle according to claim 1, wherein the predetermined cross-sectional shape of the compressed fiber bundle is elliptic and the energy beams has a spot diameter slightly larger than the major axis of the elliptic opening.

4. A method for manufacturing a final fiber bundle according to claim 1, which further comprises winding the fiber bundle with a removal material to obtain a hank, and then cutting the hank to obtain cut hanks each having a predetermiend length prior to the compressing step.

5. A method for manufacturing a final fiber bundle according to claim 1, wherein said compressed fiber bundle is the one obtained by pressure molding the original fiber bundle in such a manner that the resulting compressed fiber bundle has a square-shaped cross-section.

6. A method for manufacturing a final fiber bundle for use in brushes which comprises the steps of:
   (a) arranging a number of synthetic thermoplastic fibers in such a manner that at least one end of each of the fibers is positioned in the same plane, to obtain a fiber bundle,
   (b) compressing the thus arranged thermoplastic fibers to the extent that a predetermined bulk density is reached, whereupon the fiber ends in the same plane seem to constitute an end surface of the fiber bundle, (c) irradiating the end surface of the bundle with energy beams in such a manner that they are applied to a prdetermined area of the end surface of the bundle to fusion bond together the fiber ends included in said predetermined area, and (d) separating the thus partly irradiated fiber bundle into a fiber bundle portion having a fusion bonded layer and a fiber bundle portion having no fusion bonded layer, thereby to obtain a final fiber bundle having a fusion bonded layer.

7. A method for manufacturing a final fiber bundle according to claim 6, wherein the energy beams are carbonic acid gas laser beams.

8. A method for manufacturing a final fiber bundle according to claim 6, wherein the end surface of the fiber bundle is irradiated with the energy beams through a mask provided with at least one opening having a predetermined shape.

9. A method for manufacturing a final fiber bundle according to claim 6, wherein the end surface of the fiber bundle is elliptic in shape and said energy beams have a spot diameter slightly larger than the minor axis of the elliptic opening, said end surface being irradiated by the energy beams scanning in the direction of the major axis of said elliptic opening.

10. A method for manufacturing a final fiber bundle according to claim 6, which further comprises winding the fiber bundle with a removal material to obtain a hank, and then cutting the hank to obtain cut hanks each having a predetermined length prior to the compressing step.

11. A method for manufacturing a final fiber bundle according to claim 6, wherein the fiber bundle is wound with a paper band and is then compressed to the extent that a space ratio of 20-50% is reached.

12. A method for manufacturing a final fiber bundle according to claim 6, wherein said compressed fiber bundle is the one obtained by pressure molding the original fiber bundle in such a manner that the resulting compressed fiber bundle has a square-shaped cross section.

13. A method for manufacturing a final fiber bundle for use in brushes, which comprises the steps:

(a) arranging a number of non-thermoplastic fibers in such a manner that at least one end of each of the fibers is positioned in the same plane, to obtain a fiber bundle, (b) compressing the thus arranged non-thermoplastic fibers to the extent that a predetermined bulk density is reached, whereupon the fiber ends in the same plane seem to form an end surface of the fiber bundle, (c) applying a predetermined amount of a powdered thermoplastic adhesive to said end surface, (d) irradiating the powdered thermoplastic adhesive-applied end surface with energy beams in such a manner that they are applied to a predetermined area of the end surface of the bundle to bond together the fiber ends in said predetermined area with aid of the fused thermoplastic adhesive, and (e) separating the thus partly irradiated fiber bundle into a fiber bundle portion having a bonded layer and a fiber bundle portion having no bonded layer thereby to obtain a final fiber bundle having a bonded layer.

14. A method for manufacturing a final fiber bundle according to claim 1, wherein the fiber bundle is wound with a paper band and is then compressed to the extent that a space ratio of 20-50% is reached.

15. A method for manufacturing a final fiber bundle according to claim 13, wherein the fiber bundle is wound with a paper band and is then compressed to the extent that a space ratio of 20-50% is reached.

16. A method for manufacturing a final fiber bundle according to claim 13, wherein said compressed fiber bundle is the one obtained by pressure molding the original fiber bundle in such a manner that the resulting compressed fiber bundle has a square-shaped cross section.

* * * * *